United States Patent
Chu

(10) Patent No.: US 10,744,625 B2
(45) Date of Patent: Aug. 18, 2020

(54) SOCKET HAVING FUNCTIONS OF TORQUE SENSING, ANGLE SENSING AND SIGNAL TRANSMITTING

(71) Applicant: CHINA PNEUMATIC CORPORATION, Taoyuan (TW)

(72) Inventor: Hsiu-Feng Chu, Taoyuan (TW)

(73) Assignee: China Pneumatic Corporation, Taoyuan (TW)

( * ) Notice: Subject to any disclaimer, the term of this patent is extended or adjusted under 35 U.S.C. 154(b) by 133 days.

(21) Appl. No.: 16/152,156

(22) Filed: Oct. 4, 2018

(65) Prior Publication Data
US 2019/0126448 A1 May 2, 2019

(30) Foreign Application Priority Data
Oct. 30, 2017 (TW) .............................. 106137425 A

(51) Int. Cl.
*B25B 23/142* (2006.01)
*B25B 13/06* (2006.01)
*G01L 3/10* (2006.01)
*G01B 21/22* (2006.01)

(52) U.S. Cl.
CPC .......... *B25B 23/1425* (2013.01); *B25B 13/06* (2013.01); *G01L 3/108* (2013.01); *G01B 21/22* (2013.01)

(58) Field of Classification Search
CPC ..... B25B 23/1425; B25B 13/06; G01L 3/108; G01B 21/22

USPC ....................................................... 73/862.21
See application file for complete search history.

(56) References Cited

U.S. PATENT DOCUMENTS

| | | | | |
|---|---|---|---|---|
| 7,275,450 B2 * | 10/2007 | Hirai | ...................... | B25B 21/00 73/862.21 |
| 9,026,379 B2 * | 5/2015 | Chu | ...................... | G01L 25/003 702/41 |
| 10,055,623 B2 * | 8/2018 | Chu | ......................... | F16B 31/02 |
| 2015/0041162 A1 * | 2/2015 | Chu | ..................... | B25B 23/1456 173/1 |

FOREIGN PATENT DOCUMENTS

TW  I569923  2/2017

* cited by examiner

*Primary Examiner* — Octavia Hollington
(74) *Attorney, Agent, or Firm* — Muncy, Geissler, Olds & Lowe, P.C.

(57) ABSTRACT

A socket having functions of torque sensing, angle sensing, and signal transmitting is provided. The socket includes a socket body, a circuit board module, a deformation strain sensing unit, an output/input module, a power supply module, and a protection device. Wherein, the socket body has variable structures to accommodate the circuit board module, the deformation strain sensing unit, the power supply module and the output/input module, and to protect the accommodated elements by the protection device. Accordingly, the socket has the functions of torque sensing, angle sensing, and signal transmitting.

13 Claims, 9 Drawing Sheets

SOCKET HAVING FUNCTIONS OF TORQUE SENSING, ANGLE SENSING AND SIGNAL TRANSMITTING

CROSS-REFERENCE TO RELATED APPLICATION

This application claims priority from Taiwan Patent Application No. 106137425, filed on Oct. 30, 2017 at Taiwan Intellectual Property Office, the contents of which are hereby incorporated by reference in their entirety for all purposes.

BACKGROUND OF THE INVENTION

1. Field of the Invention

The present invention is related to a technical field of sockets for application in torque tools, and in particular, is related to a socket having the functions of torque sensing, angle sensing, and signal transmitting.

2. Description of the Related Art

As shown in FIG. 4 of Taiwan Patent No. 1569923, identification codes and production trace data in the radio-frequency tags attached to a "tag bolt" and a "tag nut" are read by a radio-frequency reader built-in a torque transducer. Further, the bolting data will be written into the tag when the tightening process is finished. As in the transmission socket shown in FIG. 5, information such as bolt identification code, and bolting data can be received by a built-in wireless transmission module, and the identification codes and bolting data in RFID tags adhered to a "tag bolt" and a "tag nut" are then read by a built-in RFID reader. Such methods identify whether the used bolt is correct by reading the bolt tag and following the production trace.

The code on the bolt is read and the bolting sequence is then edited by the controlling device according to the bolting sequence control logic shown in FIGS. 8, 9 and 10 therein, to assist an operator following the bolting sequence and write bolting data onto the tags, or to alert or stop the tool when the operator does not follow the specified bolting sequence Although the aforementioned patents provided by the inventor have been granted, there are still some problems that need to be improved upon implementation. In a practical sense, the bolting sequence should be monitored throughout the process and the critical joint needs to have accurate clamping force or tightening torque control and operation record. The former needs to use the Transmitting Socket and high cost Sensing Bolt while the latter needs to use a Torque Transducer with a reading device provided with a RFID reader and low cost Tag Bolt or Tag Nut. However, the Transmitting Socket shown in FIG. 5 of the aforementioned patent does not have the function of sensing the torque and angular movement and it always has the problem of frequency interference among adjacent bolts while receiving the sensed signal from the Sensing Bolt and transmitting to the control device wirelessly. Furthermore, the transmitting socket can only be used with the Sensing Bolt. When the transmitting socket is used with the tag bolt, it can only read the information such as identification codes of the tag, but is not able to provide the information related to bolting data such as torque, time, operator ID and so on. During the tightening process, in addition to controlling the bolting sequence, it is also required to record the relevant bolting data on both types of bolt. It can only add a transmitting socket in the front end of the torque transducer shown in FIG. 4 in aforementioned patents to be capable of reading/writing data on both types of bolt. This will increase the length of the tool output drive end and make the operation inconvenient. Meanwhile, the transmitting socket as shown in the FIG. 5 only has one radio transmitting module. The transmission power needs to be adjusted to the amount powerful enough to connect the remote control device. The transmission interference may occur among adjacent sensing bolts if an attempt on reading/writing the information on the sensing bolt simultaneously is made.

SUMMARY OF THE INVENTION

To solve the above problems, the present invention provides a socket with functions of torque sensing, angle sensing, and signal transmission which is able to improve the practicality and convenience of operations.

The present invention provides a socket with functions of torque sensing, angle sensing, and signal transmitting, including a socket body having an input drive end and an output drive end. The input drive end has a specification corresponding to a drive axle of a torque tool. The output drive end has a specification corresponding to a sensing bolt, a tag bolt, or a nut. An outer surface of the socket body is depressed inward to form a component accommodating portion. Further, the socket includes a circuit board module including a microprocessor, an amplify circuit unit, a charge circuit unit, a protection circuit unit, an angle sensing unit, a memory unit, a first wireless transmission unit, a first transmission antenna, a second wireless transmission unit, a second transmission antenna, a radio-frequency read, or write unit and a radio-frequency antenna. The microprocessor is electrically connected to each element on the circuit board module. The first transmission antenna is connected to a torque control device through a first channel of the socket body. The second wireless transmission unit, via the second transmission antenna, electrically reads/writes information of the sensing bolt. The radio-frequency read & write unit, via the radio-frequency antenna, electrically reads or writes information of the tag bolt. A deformation strain sensing unit is adhered to the deformation strain sensing axle. The output/input module is arranged at the component accommodating portion and includes an alert unit, a switch unit, and a universal serial bus. The alert unit is configured to send a warning message. The switch unit is configured to switch the socket on or off. The universal serial bus is configured to output/input a signal or power to the circuit board module: the socket further includes a power supply module being a disposable battery or a rechargeable battery capable of detaching and being replaced, which is disposed at the socket body, and is directly or indirectly connected to the circuit board module. The socket further includes a protection device disposed at a periphery of the component accommodating portion to cover and protect elements disposed therein. Wherein, the deformation strain sensing unit and the output/input module are electrically connected with the circuit board module via the second channel of the socket body.

Preferably, the socket body includes an upper body and a lower body. The upper body has an end having the input drive end and a first locking portion. The lower body has an end having a second locking portion and an output drive end. The upper body and the lower body are detachably assembled by the first locking portion and the second locking portion, and are fixed by a locking device. The socket body further includes a first accommodating portion and a second accommodating portion adjacent to each other. The first accommodating portion, the second accommodating portion, the input drive end, and the output drive end are disposed coaxially. The power supply module is disposed at the first accommodating portion. The circuit board module is disposed at the second accommodating portion. The power supply module is connected to a power contact assembly of the circuit board module electrically. Further, the socket body includes a power supply cap and a circuit board cap. The power supply cap is detachably disposed at the first accommodating portion, and is located at the end which is not connected to the second accommodating portion. The circuit board cap is disposed at the second accommodating portion, and is located at the end which is not connected to the first accommodating portion. The circuit board cap is made of a material which does not block wireless transmission.

Preferably, the transmission power of the second wireless transmission unit, the second transmission antenna, the radio-frequency read/write unit, and the radio-frequency antenna are adjusted to be only able to read/write the information of the sensing bolt or the tag bolt connected to the socket body, and is configured to avoid interfering with other adjacent sensing bolts or the tag bolts.

Preferably, the second transmission antenna and the radio-frequency antenna are integrated into a stretchable and elastic antenna which is exposed to the space of the output drive end to allow reading or writing the information from the sensing bolt or the tag bolt more effectively.

DESCRIPTION OF THE PREFERRED EMBODIMENTS

In the embodiments described below, the technical features thereof such as sensing bolts and tag bolts are already described in Taiwan Patent No. 1569923. Thus, the contents of which are hereby incorporated by reference in their entirety for all purposes. The present invention mainly improves the said published patent in order to do bolting sequence control and apply the technique more efficiently in monitoring or auditing the bolting records of a tightened joint afterwards while adopting the sensing bolts and tag bolts simultaneously.

Figure 9:
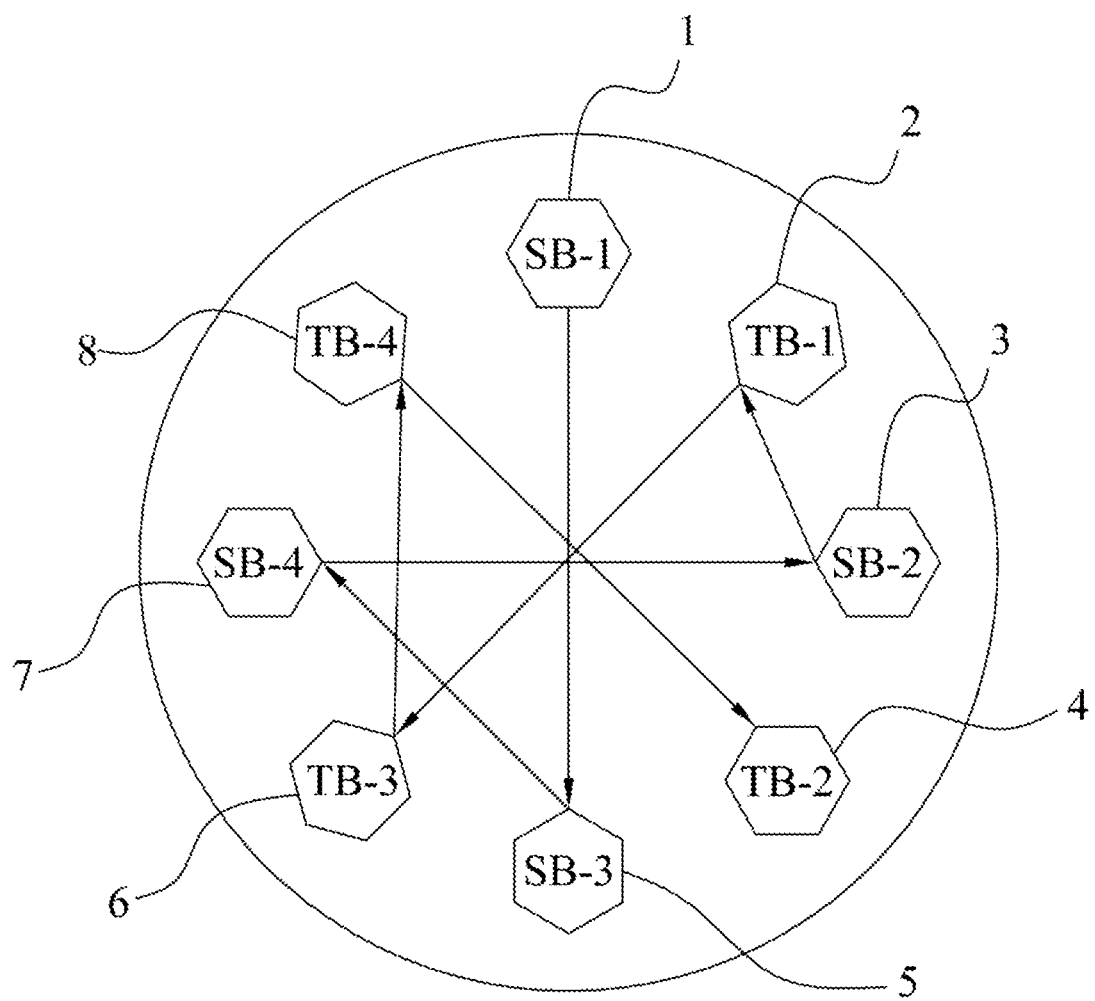
FIG. 9 illustrates an implementation schematic view of the socket of the present invention applying on the monitoring of locking orders.

In addition, in Taiwan Patent Application No. 106109855 which is another patent application filed by the present inventor, the contents of which are also hereby incorporated by reference in their entirety for all purposes. Referring to FIGS. 9 and 10 of said patent application, the designs of the transmission socket and the operation method of the sensing bolts are provided in detail. However, the transmission socket of said patent application does not have the functions of torque sensing and angle sensing. When tightening sensing bolts or tag bolts, only the information such as the operator's ID and the date of operation can be written in the tags but the tags lack information such as the torque applied or the angle tightened.

Figure 1:
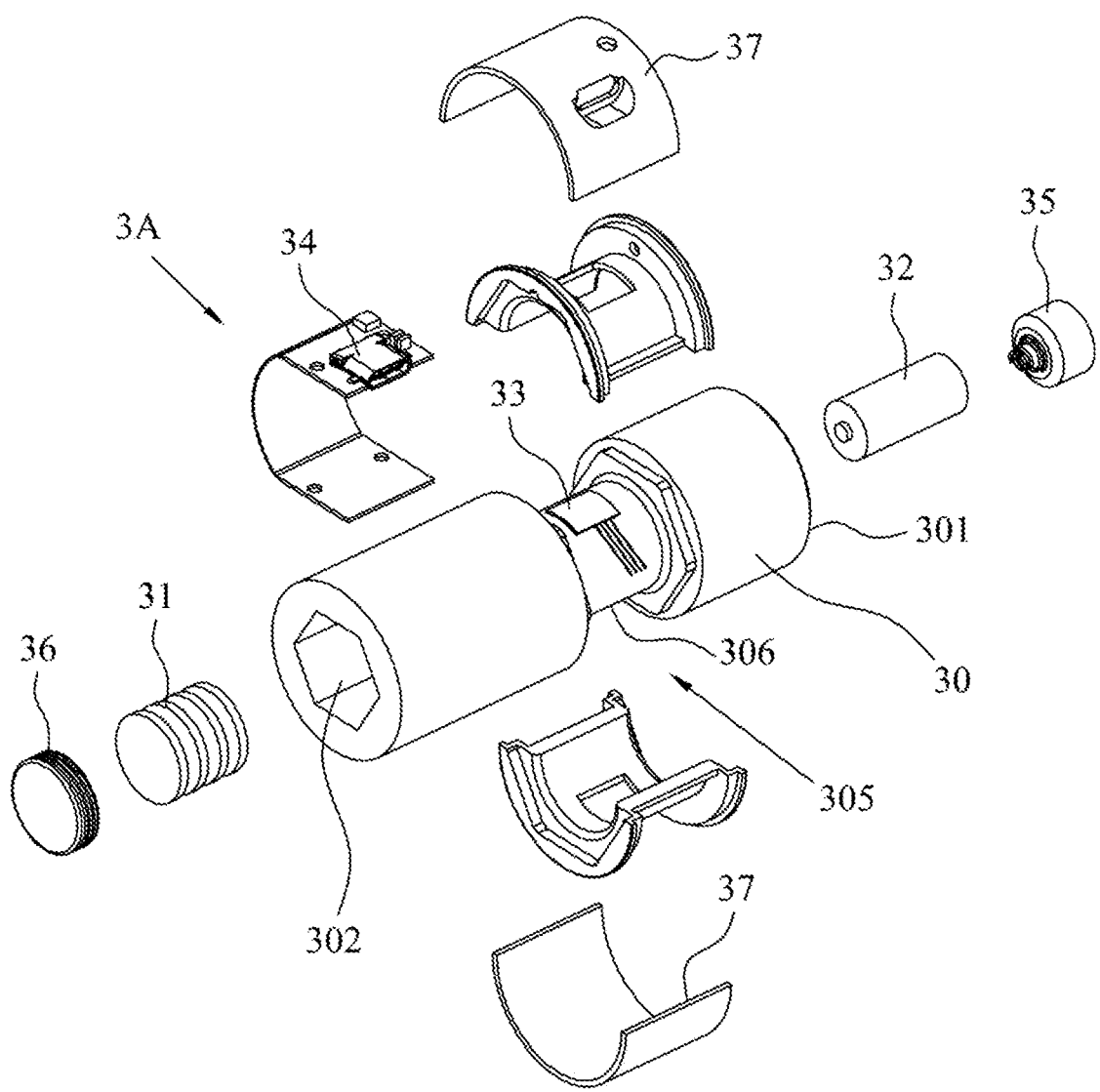
FIG. 1 illustrates an exploded view of the first embodiment of the socket of the present invention.
Figure 2:
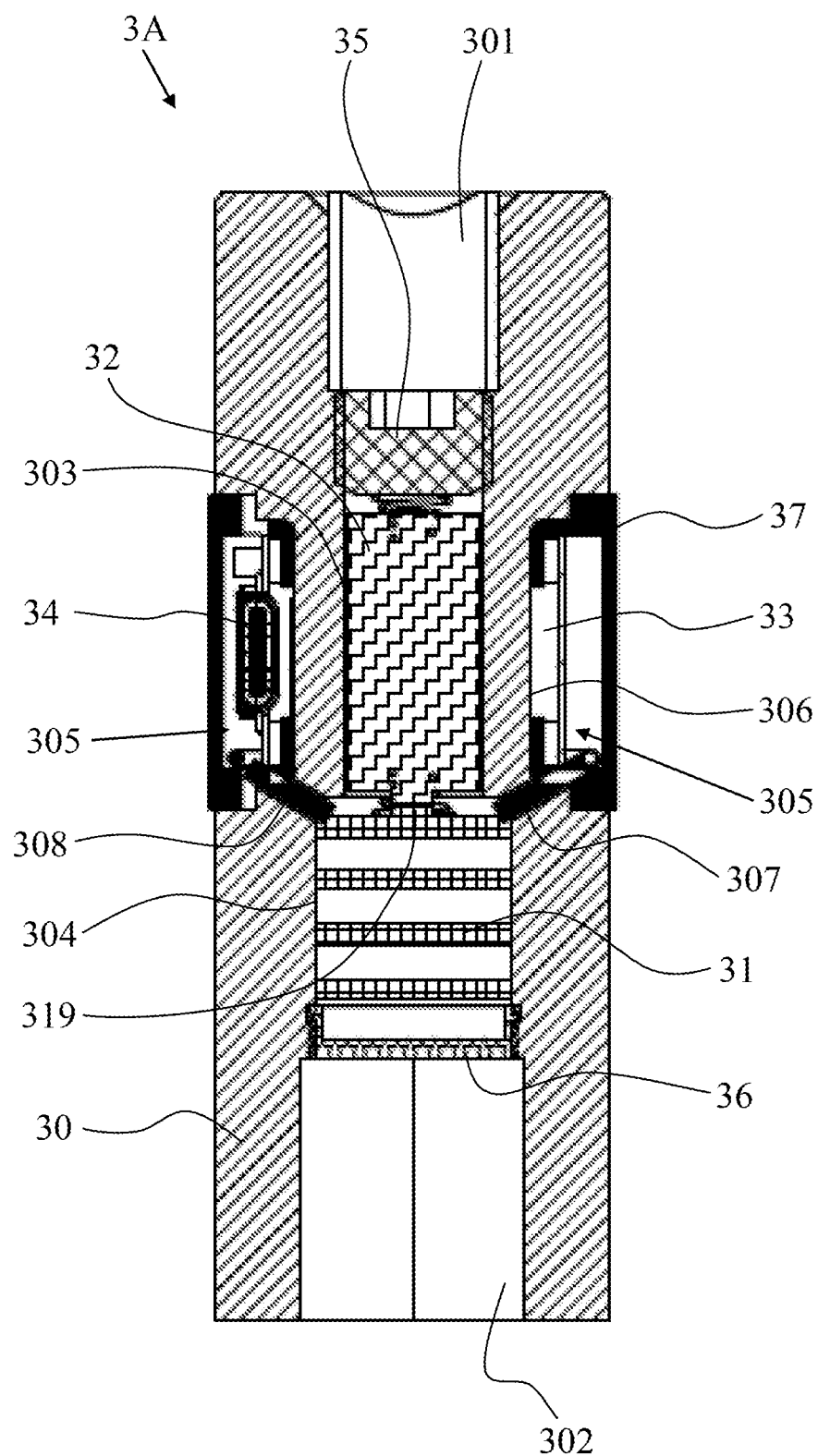
FIG. 2 illustrates an assembled view of the first embodiment of the socket of the present invention.
Figure 7:
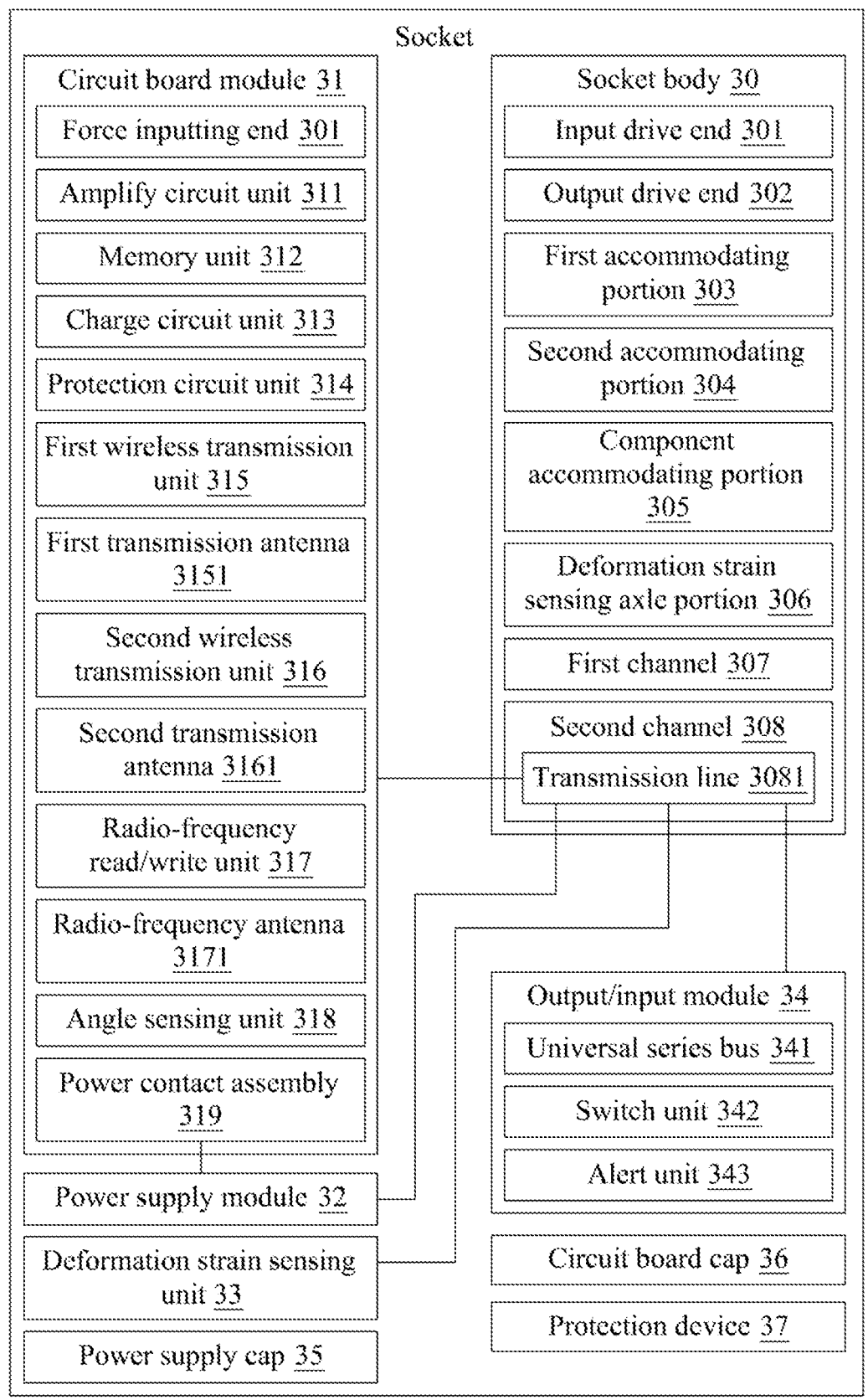
FIG. 7 illustrates a block diagram of the socket of the present invention.

Please refer to FIGS. 1, 2, and 7. The socket 3A with functions of torque sensing, angle sensing, and a signal transmission of the present invention includes a socket body 30, a circuit board module 31, a power supply module 32, a deformation strain sensing unit 33, and an output/input module 34.

The socket body 30 has one end having an input drive end 301 for coupling with a drive axle of a torque tool, and the other end having an output drive end 302 for coupling with the bolts or nuts with various specifications respectively. The socket body 30 includes a first accommodating portion 303 and a second accommodating portion 304 which are adjacently disposed along the axial direction. The power supply module 32 is a disposable battery or a rechargeable battery capable of being detached and replaced. The power supply module 32 is disposed at the first accommodating portion 303, and the circuit board module 31 is disposed at the second accommodating portion 304. The power supply module 32 is electrically connected to a circuit board module 31 via a power contact assembly 319. The outer surface of the socket body 30 is depressed inward to form a component accommodating portion 305 around the axis. The deformation strain sensing unit 33 is attached to a deformation strain sensing axle portion 306 inside the component accommodating portion 305 to sense a deformation strain value. The deformation strain sensing unit 33 may be an element, such as a strain gauge or an element having similar functions to sense the deformation caused by an applied torque. In addition, the socket body 30 further includes a first channel 307 and a second channel 308 which connects the second accommodating portion 304 and the component accommodating portion 305. In the present embodiment, the component accommodating portion 305 connected with the socket body 30 is shown as an exemplary aspect herein, but is not limited thereto.

The output/input module 34 is disposed at the component accommodating portion 305, and includes a universal serial bus 341, a switch unit 342, and an alert unit 343. The universal serial bus (USB) 341 is disposed to output/input a signal or external power to the circuit board module 31. The switch unit 342 may be a reed switch or an element having similarly functions. The alert unit 343 may be an LED or a buzzer configured to send an alert message, showing the status (such as battery capacity, power on/off) of the socket by using various colors or reporting result by sound effects.

The deformation strain sensing unit 33 and the output/input module 34 are electrically connected to the circuit board 31 with the transmission line 3081 passing through the second channel 308, in order to transmit signals, power or a combination thereof.

The circuit board module 31 includes a microprocessor 310 electrically or indirectly connected to each of the elements, e.g., the amplify circuit unit 311, the memory unit 312, the charge circuit unit 313, the protection circuit unit 314, the first wireless transmission unit 315, the first transmission antenna 3151, the second wireless transmission unit 316, the second transmission antenna 3161, the radio-frequency read/write unit 317, the radio-frequency antenna 3171, the angle sensing unit 318, and the power contact assembly 319.

The first transmission antenna 3151 is guided into the component accommodating portion 305 through the first channel 307 to wirelessly communicate with a torque control device. The second transmission antenna 3161 is electrically connected to the second transmission unit 316 to read/write the information of sensing bolts. The radio-frequency antenna 3171 is electrically connected to the radio-frequency read/write unit 317 to read/write the information of tag bolts.

In addition, the socket 3A of the present invention further includes a power supply cap 35, a circuit board cap 36, and a protection device 37. The power supply cap 35 is detachably disposed at the first accommodating portion 303 and is located at the end which is not connected to the second accommodating portion 304. The circuit board cap 36 is disposed at the second accommodating portion 304 and is located at the end which is not connected to the first accommodating portion 303. The protection device 37 is disposed at the periphery of the component accommodating portion 305 to cover and protect the elements disposed therein, such as the deformation strain sensing unit 33 and the output/input module 34. The elements will be fixed and protected by the power supply cap 35, the circuit board cap 36, and the protection device 37 after the configuration is accomplished.

The circuit board cap 36 should be made of the material which does not block the wireless transmission of the second wireless transmission unit 316 and the radio-frequency read/write unit 317 while reading/writing the information of bolts. In the case that the first transmission antenna 3151 is connected to the component accommodating portion 305 through the first channel 307, the protection device 37 should be made of the material which does not block the wireless transmission.

Figure 3:
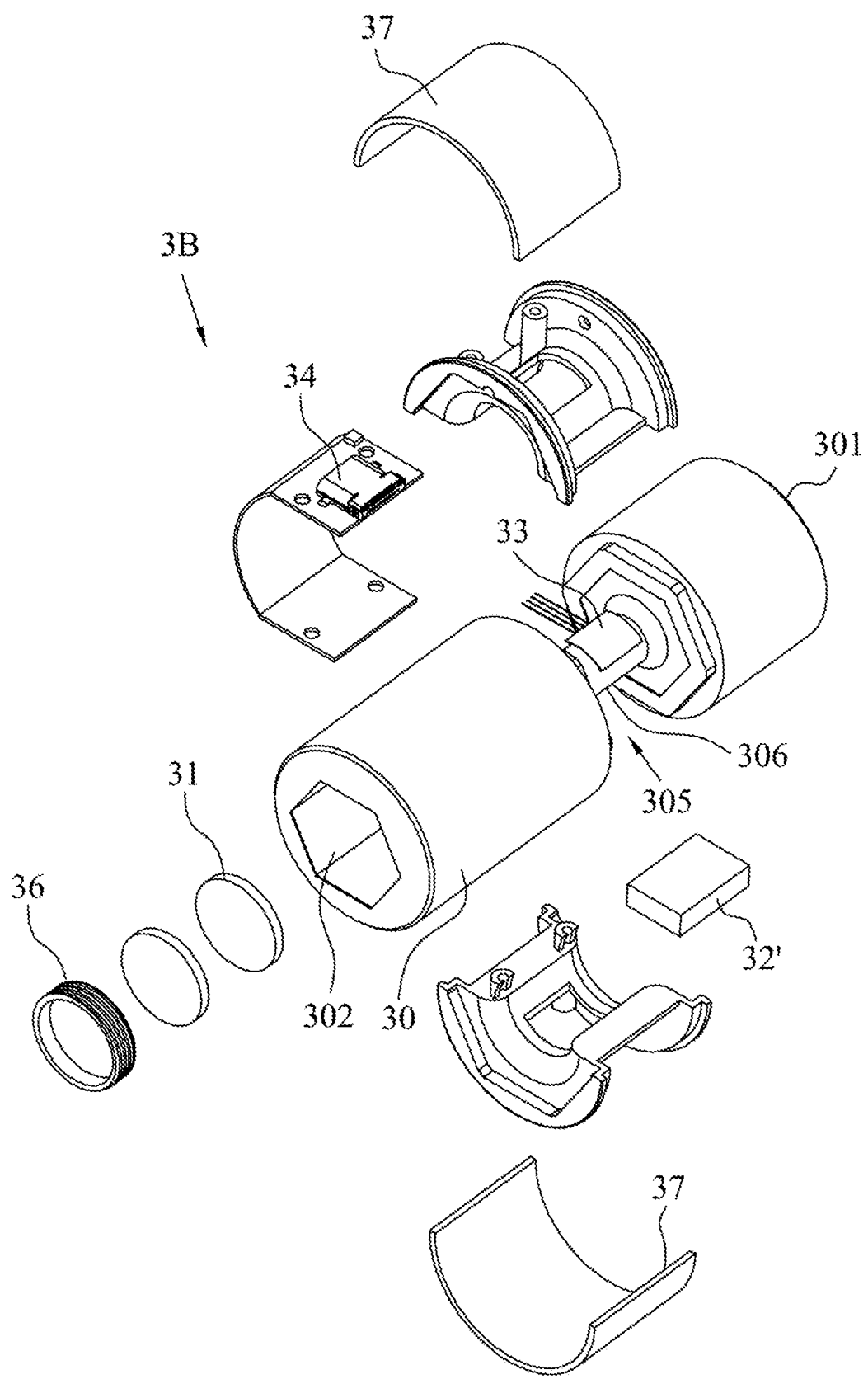
FIG. 3 illustrates an exploded view of the second embodiment of the socket of the present invention.
Figure 4:
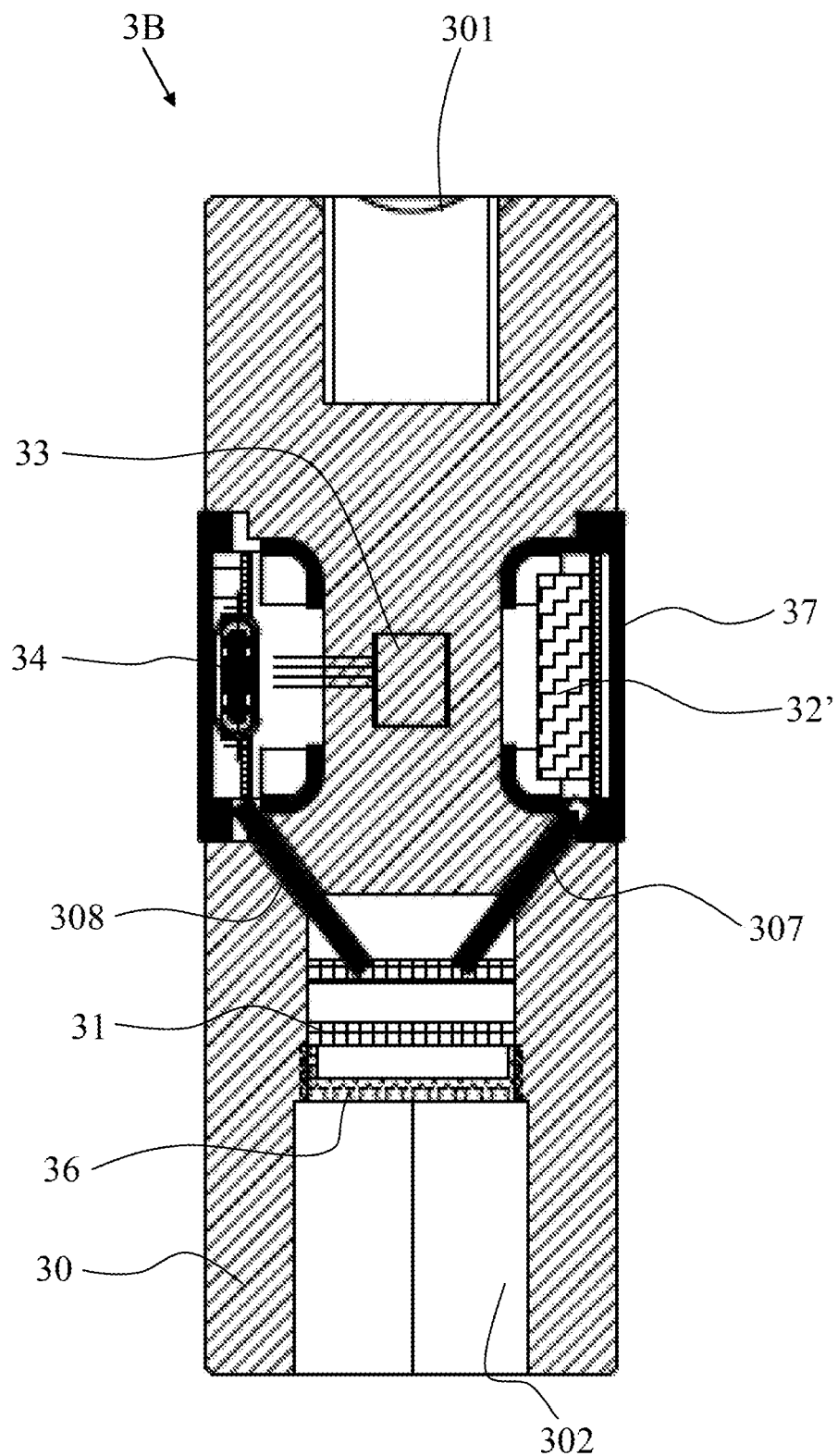
FIG. 4 illustrates an assembled view of the second embodiment of the socket of the present invention.

Please refer to FIGS. 3, 4 and 7. The main differences between the present embodiment and the aforementioned one are that the first accommodating portion of the socket 3B is replaced by a solid deformation strain sensing axle portion 306 in comparison with the socket 3A; and that the power supply module 32' is disposed within the component accommodating portion 305 instead. The power may be connected to the USB 341 to charge the power supply module 32' through the charge circuit unit 313 and the protection circuit unit 314. Descriptions of the present embodiment identical or similar to the previous embodiments shall not be explained in detail herein.

Figure 5:
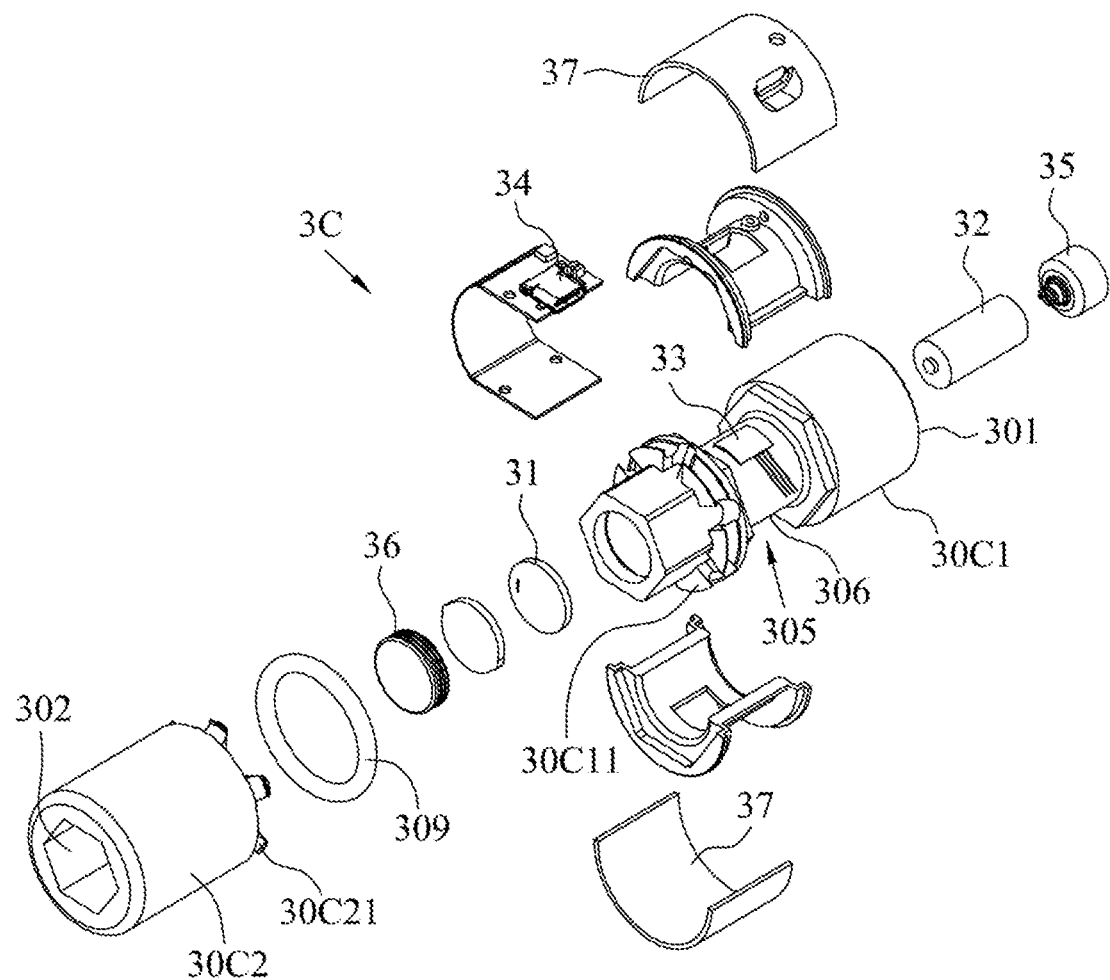
FIG. 5 illustrates an exploded view of the third embodiment of the socket of the present invention.

Please refer to FIGS. 5 and 7. In the present embodiment, the socket 3A of the first embodiment and the socket 3B of the second embodiment are modified as the socket 3C which is a combination of the upper body 30C1 and the lower body 30C2. As shown in the figures, the upper body has an end having the input drive end 301 and another end having the first locking portion 30C11; the lower body 30C2 has an end having the second locking portion 30C21 and an output drive end 302. The upper body 30C1 and the lower body 30C2 are detachably assembled by the first locking portion 30C11 and the second locking portion 30C21, and then locked by a locking component 309, in order to prevent both of the portions from separating during the tightening process. Wherein, the elements such as the circuit board module 31, the power supply module 32, the deformation strain sensing unit 33 and the output/input module 34 are disposed within the upper body 30C1 as the same configuration in the first embodiment.

Due to the configuration of the present embodiment, the output drive end 302 of the lower body 30C2 may be manufactured according to the specifications of the bolts or nuts to be tightened in such a way that the operator may use the same upper body 30C1 and alternatively replace the lower bodies 30C2 with different types in order to reduce tool acquisition costs efficiently.

Figure 6:
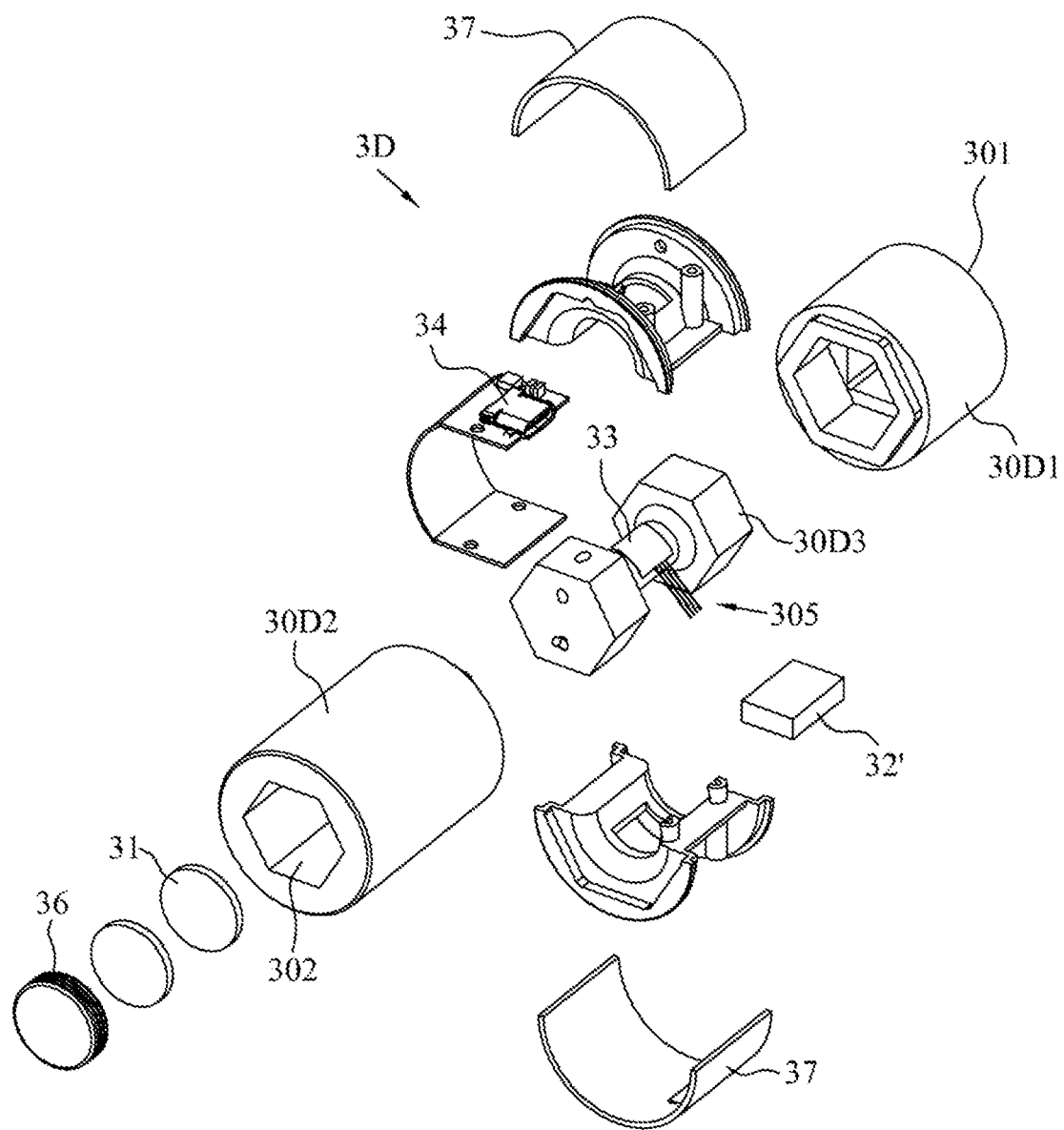
FIG. 6 illustrates an exploded view of the fourth embodiment of the socket of the present invention.

Please refer to FIGS. 6 and 7. As shown in the figures, the socket body 30 of the socket 3D of the present embodiment is a sectional design which splits the socket bodies 30 of the first and the second embodiments into the upper body 30D1, the lower body 30D2, and the sensing axle portion 30D3. As shown, the upper body 30D1 and the lower body 30D2 are assembled at the two ends of the sensing axle portion 30D3 respectively. Afterward, the component accommodating portion 305 is formed at the periphery of the sensing axle portion 30D3. The present embodiment mainly utilizes a sensing axle 30D3 having lower torque and capable of maintaining high sensitive measurement accuracy, which is alternatively made of the same material as the upper body 30D1, the lower body 30D2, non-ferrous metals, or nonmetal materials. In the present embodiment, the power supply module 32' is disposed at the component accommodating portion 305, and the deformation strain sensing unit 33 is still attached to the sensing axle portion 30D3 within the component accommodating portion 305 to sense deformation strain values. Descriptions of the present embodiment identical or similar to the previous embodiments shall not be explained in detail herein.

Additionally, the circuit board module 31 can be manufactured as one or more modules. If a plurality of modules are stacked and connected, the second wireless transmission unit 316, the second transmission antenna 3161, the radio-frequency read/write unit 317, the radio frequency antenna 3171, and an additional microprocessor are electrically connected and form "another circuit board module," then electrically connected to the circuit board module formed of remaining elements and the original microprocessor 310. If the two circuit board modules are stacked within the second accommodating portion 304, then the "another circuit board module" shall be disposed at the end surface of the second accommodating portion 304 nearest to the bolts.

Figure 8:
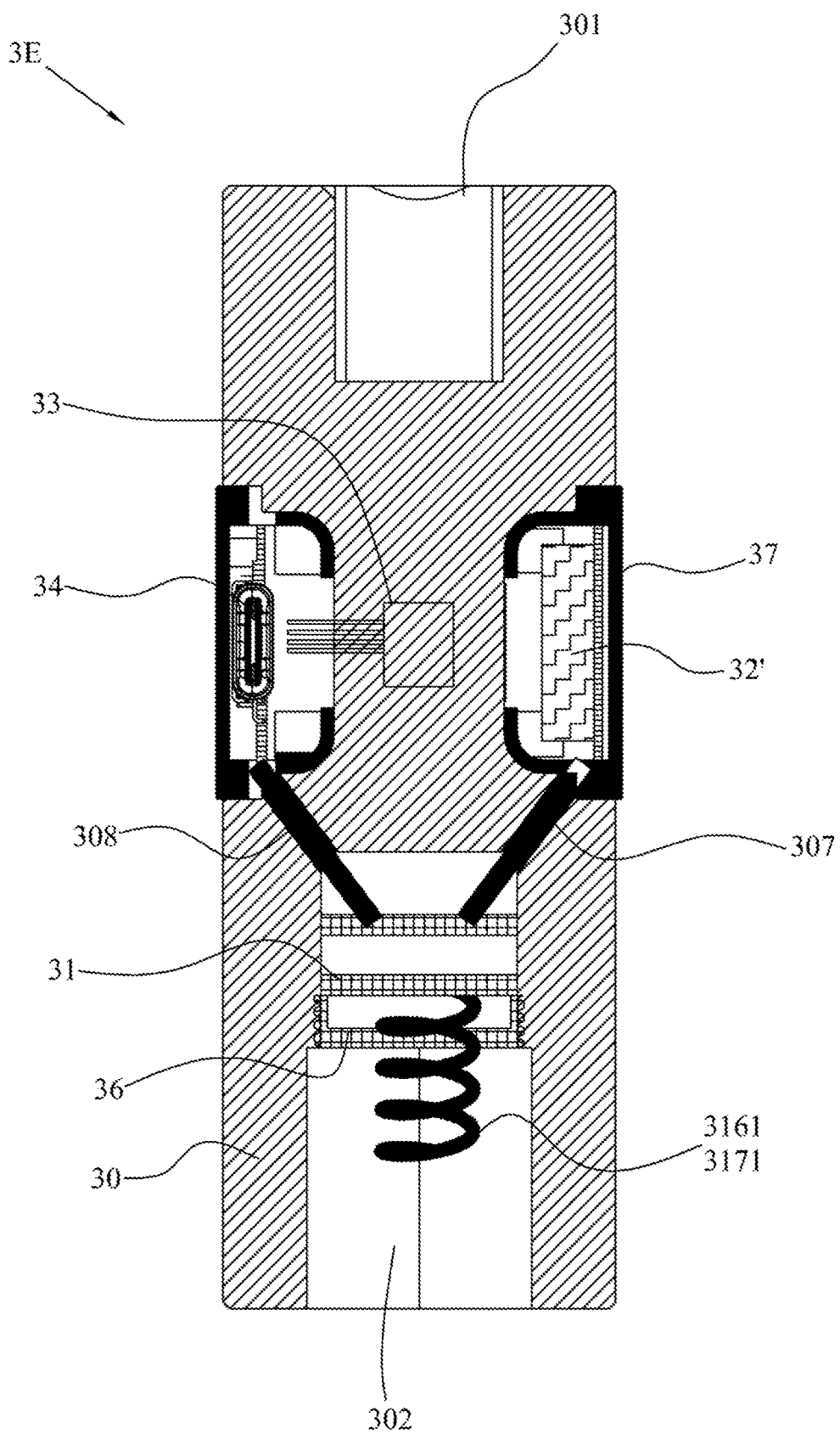
FIG. 8 illustrates an assembled view of the socket of the fifth embodiment of the present invention.

Please refer to FIG. 8. The socket 3E of the present invention is shown as the figure. The second transmission antenna 3161 and the radio-frequency antenna 3171 are integrated as a flexible and elastic antenna which is exposed to the space within the output drive end 302. The antenna is manufactured as various types corresponding to a best effect in such a way that the antenna may be positioned nearest to or against the end surface of the bolt, so as to ensure efficiency of reading/writing the information of sensing bolts or tag bolts.

Descriptions of the present embodiment identical or similar to the previous embodiments shall not be explained in detail herein. In addition, the aspect that said second transmission antenna 3161 and the radio-frequency antenna 3171 integrated as the flexible and elastic antenna may also be applied to every aforementioned embodiment in the case of no conflict.

Please refer to FIG. 9, which is an example of the bolting operation of an assembled component in which the various sockets 3A to 3D of the present invention are applied in a combination of the sensing bolts and tag bolts. The sensing bolts SB-1 to SB-4 are utilized at the critical joints 1, 3, 5, 7, and the tag bolts TB-1 to TB-4 are utilized at the joints 2, 4, 6, 8. During the preloading process, the socket reads the code of each bolt in clockwise or anti-clockwise directions, wherein the circuit board module 31 reads the information of the sensing bolts by the second wireless transmission unit 316 and the antenna 3161, while reading the information of the tag bolts by the radio-frequency read/write unit 317 and the antenna 3171. Whereas, said two types of the information are communicated externally to a torque control device by the first wireless transmission unit 315 and the first transmission antenna 3151.

Subsequently, the torque control device edits the program of the bolting sequence and the stages of bolting, the tightening torque or the clamping force of each stage depending on the continuously received codes of the bolts. Then, the bolting is initiated according to the instructions of the control device. For instance, an assembly is tightened by four M20 sensing bolts SB-1~SB-4 and four M20 tag bolts TB-1~TB-4, which are mashed up and configured with intervals there between. Wherein, the demanded bolting sequence is 1-5-7-3-2-6-8-4, and the bolts should be tightened in two stages until the clamping force of 10 tons or a torque of 36 KgM has been achieved. Wherein, in the first stage, 50% of the target value force is achieved; in the second stage, the bolts are tightened to the target value. During the process, the microprocessor may distinguish the codes of different bolts in real-time through the second wireless transmission unit and the radio-frequency read/write unit. Wherein, if the socket does not align the bolt of the correct location, the socket may fail to read the correct code, the control device will send an alert instantly, and the torque tool will not be activated to prevent an error. On the other hand, if the specification of the read bolt is not correct, or the bolt is damaged or is not aligned thereby causing a time difference of bolting, the control device may compare each of the related parameters, and warning signals such as light or sound effect will be issued instantly and possible reasons may be displayed. Similarly, the tool is also unable to be activated until the problem is solved. During the process, the microprocessor may distinguish the codes of different bolts in real-time through the second wireless transmission unit and the radio-frequency read/write unit. Each step will be indicated by the torque control device as correctness or wrongness. Hence, there is no need to label or mark numbers on the bolts by hand for controlling the sequence. Wherein, the socket of the present invention is able to read the production history information such as manufacturers, dates, and the grade related to the bolts to prevent miss-use while preloading. During the bolting process, the bolting records are written into the memory unit of tags or bolts along with the operator's ID depending on the sensing results obtained by the deformation strain sensing unit and the angel sensing unit. Since the whole process is monitored, it is for sure that no problems of missing or insufficient target torque, clamping force or locking angle will occur. Afterward, the information may also be used for clarifying the attribution of construction responsibilities. Hence, the locking process with the best quality is ensured.

The description above is only for the purpose of illustration but not restriction. Without departing from the spirit of the present application, all equivalent modifications or alterations should be considered as falling within the protection scope of the appended claims.

What is claimed is:

1. A socket having functions of torque sensing, angle sensing, and signal transmitting, comprising:

a socket body comprising an input drive end and an output drive end; wherein the input drive end has a specification corresponding to a drive axle of a torque tool; the output drive end has a specification corresponding to a sensing bolt, a tag bolt or a nut; and an outer surface of the socket body is depressed inward to form a component accommodating portion;

a circuit board module disposed in the socket body, comprising a microprocessor, an angle sensing unit, a first wireless transmission unit, a second wireless transmission unit, a first transmission antenna, a second transmission antenna, a radio-frequency read/write unit, and a radio-frequency antenna; wherein the microprocessor is electrically connected to each of elements on the circuit board module; the first transmission antenna is connected to the first wireless transmission unit; the first transmission antenna is communicatively connected to a torque control device through a first channel of the socket body; the second transmission antenna is electrically connected to the second wireless transmission unit to read/write information of the sensing bolt; and the radio-frequency antenna is electrically connected to the radio-frequency read/write unit to read/write information from the tag bolt;

a deformation strain sensing unit adhered to a deformation strain sensing axle portion inside the component accommodating portion to sense deformation strain value;

an output/input module disposed at the component accommodating portion, comprising an alert unit, a switch unit and an universal serial bus, wherein the alert unit is configured to send an alert message; the switch unit is configured to switch on/off the socket with functions of torque sensing, angle sensing, and signal transmitting; and the universal serial bus is configured to output/input a signal or power to the circuit board module;

a power supply module being a disposable battery or a rechargeable battery capable of being detached and replaced, which is disposed at the socket body, and is directly or indirectly connected to the circuit board module; and a protection device disposed at a periphery of the component accommodating portion to cover and protect element disposed therein;

wherein, the deformation strain sensing unit and the output/input module are electrically connected to the circuit board module by a transmission line passing through a second channel of the socket body.

2. The socket having functions of torque sensing, angle sensing, and signal transmitting of claim 1, wherein the socket body further comprises an upper body and a lower body;

the upper body has two ends, one is the input drive end for coupling with an output drive end of a tool, and the other end is a first locking portion;

the lower body has an end with a second locking portion, and has another end having the output drive end; and the upper body and the lower body are detachably assembled by the first locking portion and the second locking portion, and are fixed by using a locking component.

3. The socket having functions of torque sensing, angle sensing, and signal transmitting of claim 2, wherein the socket body further comprises a first accommodating portion and a second accommodating portion;

the first accommodating portion, the second accommodating portion, the output drive end, and the input drive end of the socket body are disposed coaxially;

the power supply module is disposed at the first accommodating portion;

the circuit board module is disposed at the second accommodating portion; and the power supply module is connected to a power contact assembly of the circuit board module to electrically connect to the circuit board module.

4. The socket having functions of torque sensing, angle sensing, and signal transmitting of claim 3, further comprising a power supply cap and a circuit board cap made of a material which does not block wireless transmission;

wherein the power supply cap is detachably disposed at the first accommodating portion, and is located at an end which is not connected to the second accommodating portion; and the circuit board cap is disposed at the second accommodating portion, and is located at an end which is not connected to the first accommodating portion.

5. The socket having functions of torque sensing, angle sensing, and signal transmitting of claim 1, wherein the socket body further comprises a first accommodating portion and a second accommodating portion;

the first accommodating portion, the second accommodating portion, the output drive end, and the input drive end of the socket body are disposed coaxially;

the power supply module is disposed at the first accommodating portion;

the circuit board module is disposed at the second accommodating portion;

and the power supply module is connected to a power contact assembly of the circuit board module to electrically connect to the circuit board module.

6. The socket having functions of torque sensing, angle sensing, and signal transmitting of claim 1, wherein the socket body further comprises an upper body, a lower body, and a sensing axle component;

the upper body has an end having the input drive end;

the lower body has an end having the output drive end;

the component accommodating portion is formed between the strain sensing axle and the protection device; and the upper body and the lower body are disposed at two ends of the strain sensing axle respectively.

7. The socket having functions of torque sensing, angle sensing, and signal transmitting of claim 6, wherein the power supply module is electrically connected to the circuit board module through the transmission line when disposed at the component accommodating portion; and the socket body further comprises a second accommodating portion adjacent to the output drive end to accommodate the circuit board module.

8. The socket having functions of torque sensing, angle sensing, and signal transmitting of claim 7, further comprising a circuit board cap disposed at an end of the second accommodating portion which is connected to the output drive end, wherein the circuit board cap is made of a material which does not block wireless transmission.

9. The socket having functions of torque sensing, angle sensing, and signal transmitting of claim 1, wherein the power supply module is electrically connected to the circuit board module through the transmission line when disposed at the component accommodating portion; and the socket body further comprises a second accommodating portion adjacent to the output drive end to accommodate the circuit board module.

10. The socket having functions of torque sensing, angle sensing, and signal transmitting of claim 1, wherein the first channel is connected to the outer surface of the socket body, and the protection device is made of metal.

11. The socket having functions of torque sensing, angle sensing, and signal transmitting of claim 1, wherein the first channel is connected to the component accommodating portion, and the protection device is made of a material which does not block wireless transmission.

12. The socket having functions of torque sensing, angle sensing, and signal transmitting of claim 1, wherein transmission power of the second wireless unit, the second transmission antenna, the radio-frequency read/write unit, and the radio-frequency antenna is adjusted to be only able to read/write the information of the sensing bolt or the tag bolt connected to the socket body, and is configured to avoid interfering other adjacent sensing bolts or tag bolts.

13. The socket having functions of torque sensing, angle sensing, and signal transmitting of claim 1, wherein the second transmission antenna and the radio-frequency antenna are integrated into a stretchable and elastic antenna which is exposed to a space of the output drive end, to read/write the information of the sensing bolt or the tag bolt.

* * * * *